US011257305B2

(12) United States Patent
Shaw et al.

(10) Patent No.: US 11,257,305 B2
(45) Date of Patent: *Feb. 22, 2022

(54) VEHICLE CONTROL SYSTEM AND METHOD

(71) Applicant: Westinghouse Air Brake Technologies Corporation, Wilmerding, PA (US)

(72) Inventors: Karen A. Shaw, Cedar Rapids, IA (US); Thomas Paul Spiegelhalter, Jr., Cedar Rapids, IA (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 251 days.

This patent is subject to a terminal disclaimer.

(21) Appl. No.: 16/577,667

(22) Filed: Sep. 20, 2019

(65) Prior Publication Data
US 2020/0082645 A1 Mar. 12, 2020

Related U.S. Application Data

(63) Continuation-in-part of application No. 15/280,207, filed on Sep. 29, 2016, now Pat. No. 10,421,473.

(51) Int. Cl.
B60W 50/04 (2006.01)
G07C 5/00 (2006.01)
B60W 30/095 (2012.01)
B60W 30/18 (2012.01)
B60W 50/00 (2006.01)

(52) U.S. Cl.
CPC .......... *G07C 5/008* (2013.01); *B60W 30/0956* (2013.01); *B60W 50/045* (2013.01); *B60W 30/18154* (2013.01); *B60W 2050/0075* (2013.01); *B60W 2556/45* (2020.02)

(58) Field of Classification Search
CPC .... B61L 3/00; B61L 3/16; B61L 15/00; B61L 23/04; B61L 23/08; B61L 23/22; B61L 27/00; B61L 27/04
See application file for complete search history.

(56) References Cited

U.S. PATENT DOCUMENTS 9,102,341 B2 * 8/2015 Malone, Jr. ............. B61L 21/10
10,421,473 B2 * 9/2019 Shaw ...................... H04L 67/12

* cited by examiner

Primary Examiner — Robert J McCarry, Jr.
(74) Attorney, Agent, or Firm — The Small Patent Law Group LLC; Joseph M. Butscher

(57) ABSTRACT

A system is provided that includes a first communication device located at or associated with a determined zone and can accept field data; a second communication device located on or associated with at least one vehicle approaching or traversing the determined zone; and at least one controller or a control system. The controller or control system can receive the field data from the first communication device; convert at least a portion of the field data to a message comprising vehicle data; and provide the vehicle data to a vehicle controller or a vehicle operator, and thereby can control or operate the at least one vehicle based using the provided vehicle data.

20 Claims, 3 Drawing Sheets

VEHICLE CONTROL SYSTEM AND METHOD

CROSS REFERENCE TO RELATED APPLICATIONS

This application is a continuation-in-part of U.S. patent application Ser. No. 15/280,207, which was filed on 29 Sep. 2016, now U.S. Pat. No. 10,421,473, and entire contents of which are incorporated herein by reference.

BACKGROUND

Technical Field

Embodiments of the inventive subject matter relate to a control system for a vehicle and an associated method.

Discussion of Art

Vehicle systems and networks exist throughout the world, and, at any point in time, a multitude of vehicles are travelling throughout the system and network. A vehicle may approach a geographic region or zone in which its travel may be restricted or monitored. One such type of region is a construction or work zone. When a vehicle approaches a work zone, a field operator, e.g., an employee-in-charge (EIC), is responsible for instructing the vehicle on when and how to proceed through the work zone. In a fully operational system, the field operator communicates electronically through an in-field computer or terminal, which generates instructions and communicates to the vehicle directly or indirectly through a dispatch center. The dispatch center may keep a log of communications and forward the instructions to the operator.

Should the field computer fail, or fail to communicate with the vehicle and/or dispatch center, voice-over-radio communication is the only alternative to communicate instructions from the field operator to the vehicle operator. These verbal instructions inform the vehicle operator how to proceed, such as when to enter the work zone, at what speed to travel, if there are any controlled stops, etc. Although the vehicle operation may be logged by an on-board computer the verbal instructions from the field operator would not be recorded. Without records of the verbal instructions, there is little ability to verify that a vehicle was given permission to enter or move, that proper instructions were given, or if either operator followed protocol. It may be desirable to have a system and method that differs from those that are currently available.

BRIEF SUMMARY

According to one embodiment, a system is provided that includes a vehicle control system. The vehicle control system may include a first communication device located at or associated with a determined zone and that can accept audio data from a field operator; a second communication device located on or associated with at least one vehicle approaching or traversing the determined zone; and at least one processor. The processor may receive the audio data from the first communication device; convert at least a portion of the audio data to text data; and provide at least a portion of the text data to an operator of the vehicle for display. The system includes at least one database programmed or configured to receive and store at least a portion of the text data.

According to one embodiment, a system is provided that includes a first communication device located at or associated with a determined zone and configured to accept field data; a second communication device located on or associated with at least one vehicle approaching or traversing the determined zone; and at least one controller or a control system. The controller or control system can receive the field data from the first communication device; convert at least a portion of the field data to a message comprising vehicle data; and provide the vehicle data to a vehicle controller or a vehicle operator, and thereby to control or operate the at least one vehicle based using the provided vehicle data.

According to one embodiment, a method is provided that includes accepting field data from a first communication device that is located at or associated with a determined zone. The field data is received through a second communication device located on or associated with at least one vehicle approaching or traversing the determined zone. At least a portion of the field data may be converted to a message comprising vehicle data. The vehicle data may be provided to a vehicle controller or to a vehicle operator; and the at least one vehicle may be controlled or operated based at least in part on the provided vehicle data.

BRIEF DESCRIPTION OF THE DRAWINGS

Further features and aspects of the inventive subject matter are disclosed in the following detailed description made with reference to the drawings in which.

DETAILED DESCRIPTION

Figure 1:
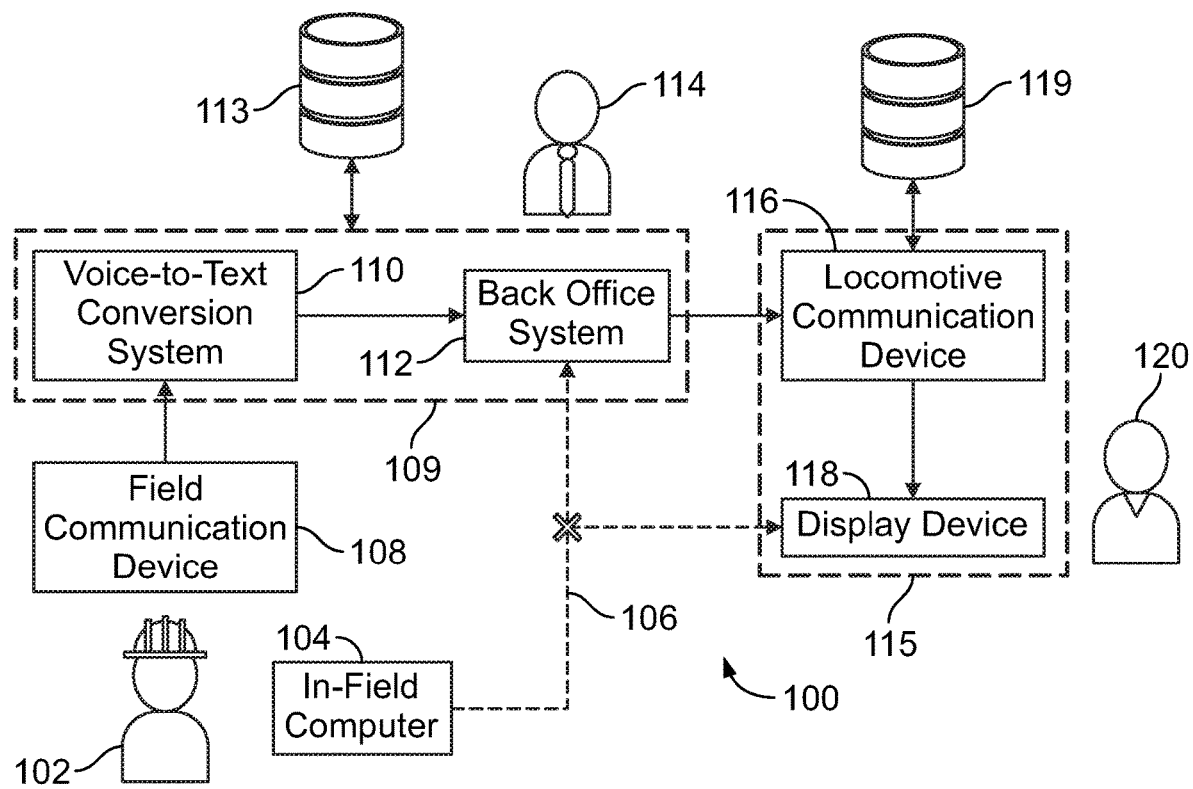
FIG. 1 is a schematic diagram of one embodiment or aspect of a system for communicating instructions to a vehicle approaching or traversing a determined zone, according to the principles of the inventive subject matter.

Embodiments of the inventive subject matter relate to a communication system for vehicles and an associated method. In one embodiment, a system is provided that includes a first communication device located at or associated with a determined zone and configured to accept field data; a second communication device located on or associated with at least one vehicle approaching or traversing the determined zone; and at least one controller or a control system. The controller or control system can receive the field data from the first communication device; convert at least a portion of the field data to a message comprising vehicle data; and provide the vehicle data to a vehicle controller or a vehicle operator, and thereby to control or operate the at least one vehicle based using the provided vehicle data.

In one embodiment, at least one database is provided that is programmed or configured to store communication data related to the field data. Suitable vehicle data may include at least one of the following: geographic data, vehicle identification data, time data. The controller or control system may, after transmitting the at least one message, store in the at least one database action data of the at least one vehicle while the at least one vehicle approaches or operates within the determined zone. The action data may include at least one of the following: vehicle location data, vehicle speed data, vehicle direction data, responsive communication data, or a combination of two or more thereof. The controller or control system can convert the vehicle data to vehicle control commands. The commands may be used to control operation of the vehicle.

In one embodiment, the controller or control system can translate a first language of words in an audio data of the field data into text, and the text is in a different second language than the first language. The controller or control system may translate text in the field data from a first language to text in the vehicle data in a second different language. The controller or control system may accept non-text messages and non-audio inputs and to translate and covert the non-text messages and non-audio inputs into text data.

The controller or control system may obtain, generate or respond to dynamic zone generation, dynamic zone size for the determined zone. That is, the geographic boundaries of what constitutes a determined zone may be recast or redrawn or recalculated, and the controller behaves as the vehicle moves relative to the newly formed boundary of the determined zone. The controller or control system can respond to moving zones based on factors provided. For example, the determined zone may be a fifty (50) foot radius around a route inspection machine. As the route inspection machine moves along a route the determined zone moves with it to keep the route inspection machine at the center of a circle having a 50 foot radius.

In one embodiment, the controller or control system can respond with notification of receipt. For example, the controller can confirm to the first communication device that the field data has been received by it, the field data has been successfully transmitted to a second communication device and/or the back office, the field data has been successfully translated, the field data has been successfully converted (e.g., from audio-to-text), that the vehicle data has been successfully generated based at least in part on the field data or the field data derivative information, that the vehicle has successfully received the vehicle data, and/or that the vehicle has confirmed receipt of vehicle data. In one embodiment, the controller can respond with a notification that the vehicle has switched operating modes (such as a throttle setting or that a brake has been applied).

In one embodiment, the controller or control system can respond with feedback of vehicle type, vehicle arrival time, vehicle group characteristics, other characteristics associated with the operation of the vehicle and/or vehicle group. Vehicle group characteristics may include the number of vehicles in the vehicle group, the spacing of the vehicles of in the vehicle group, the order of the vehicles in the vehicle group, as well as information about the individual vehicles in the vehicle group. The operation characteristics may include the inbound route designation, the speed, the estimated arrival time to the boundary of the determined zone, and the like.

The controller or control system can store input and output. The input and output can be files, or parts of files, that travel through the controller or are moved or created at its direction. The files can be concatenated, can be labeled and stamped, and can be organized for later use or retrieval. In one embodiment, the stored input can be used to check the accuracy and veracity of output files. The controller or control system can communicate to other vehicles in the vehicle group. As such, one controller may take on the responsibilities of various actions for multiple vehicles. Additionally, a various action for one vehicle may be distributed across the controllers of the multiple vehicles. In another aspect, some or all of the controller functions may be accomplished off-board all of the vehicles. For off-board activity a cloud-based solution may be used to coordinate activity and store field data, vehicle data, or both in a cloud-based environment or the like.

A suitable field display device may be positioned in the determined zone, the field display device may receive the text data from the at least one processor and may present the text data to the field operator for review and comparison to the audio data that was communicated to the at least one processor by the field operator.

The controller may encrypt the at least one message prior to transmitting the at least one message. As a method, the field data from a first communication device that is located at or associated with a determined zone may be accepted. The field data may be received through a second communication device located on or associated with at least one vehicle approaching or traversing the determined zone. At least a portion of the field data may be converted to a message that includes vehicle data. The vehicle data may be provided to a vehicle controller or to a vehicle operator. The vehicle may be operated or controlled based at least in part on the provided vehicle data. The vehicle data may be compared to the field data to determine if discrepancies exist therebetween. At least a portion of the field data or a portion of the vehicle data may be stored in a database.

With reference to FIG. 1, an embodiment is shown as a schematic diagram of a communication network 100 for communicating instructions from a field operator 102 to a vehicle 115 having a vehicle operator 120. A field operator may be an employee-in-charge (EIC) that oversees a work zone or another person or device associated with the zone of interest. The vehicle may be an automobile, an over-the-road (OTR) truck, a locomotive, a marine vessel, mining or construction equipment, or aircraft. A vehicle group may include two or more of the foregoing that are in consist or communicatively coupled together. Examples of vehicle groups may include platooning OTR trucks, a train having two or more locomotives and rail cars, a collection of cooperative autonomous automobiles, and a drone swarm. The vehicle group members may remain static or may change as vehicles enter or leave the group.

The communication network may be employed in situations where the vehicle or vehicle group approaches or enters a determined zone. The vehicle may be monitored or given permission to enter or operate in the determined zone. Likewise the vehicle may have a plurality of operational modes, and the mode of operation may differ in a determined zone as opposed to outside of a determined zone. The communication network may be employed for other situations in which the vehicle must maintain communication with the field operator.

A suitable determined zone may be a work zone, a construction area, an intersection, a hazardous area, and the like. In one embodiment, the determined zone may be durable and static and of a generally fixed length or area, such as a stretch of road from mile marker to mile marker or a city limit. In one embodiment, the determined zone may be temporary but otherwise static, such as when repair work is done on a bridge or overpass. In one embodiment, the determined zone may be mobile, such as an area centered on a mobile device, a vehicle, or a beacon. In one embodiment, the determined zone may be dynamic, in which the distance or area of the zone may change based on environmental effects like flooding. In the case of a dynamic determined zone, the size of the zone may be based on a type of hazard or activity occurring within the zone, duration, vehicle operations, and the like. It is contemplated that multiple zones may be used that may be contiguous, may be partially overlapping, or may be concentric. As an example of the last case, the vehicle may enter a first zone as an outer ring and then proceed to a second zone as an inner area before translating out of the inner area to exit through the first zone and then completely out.

Messages from the field operator may be referred to as field data and may include instructions for how the vehicle may approach the zone, proceed through the zone, exit the zone, operate within the zone, and/or the like. In one communication network, the field operator uses an in-field computer 104 to communicate with a vehicle via a communicative connection 106 that communicates to the vehicle by way of a dispatch center 109. A suitable in-field computer may be an EIC terminal, a tablet, a smartphone, and the like. A suitable communicative connection may be a radio, a cell phone, an optical transmitter, and the like. The communication from the in-field computer is received by a vehicle communication device 116. An example may be a locomotive communication device disposed on a locomotive, such as LocoCOMM that is commercially available from Wabtec Corporation. The vehicle communication device may include or may be associated with a vehicle controller. The vehicle controller may be or may include one or more processor. Examples of vehicle controllers may include a head-end unit (HEU), an end-of-vehicle group device (EOT), a vehicle navigation and propulsion system, or the like. The vehicle communication device may be communicatively connected to a display device 118. A suitable display device may be a heads-up display, a graphical interface, a computer monitor, a tablet screen, and/or the like. At least a portion of the communication may be displayed on the display device.

A suitable communication device may include a transceiver, a radio, a phone, a tablet, a laptop, and/or a like communication device. If the communicative connection between the in-field computer and the dispatch center and/or vehicle fails to function the communication network may employ an alternative means of verified communication. In one embodiment, the communication network may have the field operator use a field communication device 108 to generate and communicate field data. In one embodiment, the field data is or includes an audio message. In one embodiment, the field data is a video image, either a single frame or a video feed. In one embodiment, the field data is a text message, a graphic image, a digital signature, or a menu selection. And, in one embodiment, the field data is a message that include two or more of the foregoing types of field data.

If the field data includes an audio message, the audio file may be routed to a voice-to-text conversion system 110. This conversion system may include at least a processor that is programmed or configured to convert, e.g., transcribe, audio data into vehicle data. In one embodiment, the vehicle data is text data. The conversion system may be associated with or integral to the communication device, such as a native software application stored on the communication device. Alternatively, the conversion system may be disposed with the dispatch center. The conversion system may be a transcription program on a back office system 112 server. Further, the conversion system may be associated with an independent platform, location, or service that is remote from the communication device and the dispatch center.

In one embodiment, the voice-to-text conversion system generates text data from the audio data. The system may communicate the text data, alone or in combination with the audio data, to at least one dispatch center personnel 114 associated with the dispatch center. The system may use compression algorithms and digital tools to truncate the audio file, shrink the audio file, or change the file format of the audio file. In one embodiment, a digital watermark is added to the audio file.

The converted field data, the original field data, in part or in whole, or combinations thereof may be stored as files in a database 113. The file(s) may be time/date stamped, encrypted, hashed, digitally signed, block-chain verified, and the like. The database may be associated with and/or accessible by the dispatch center. Personnel associated with the dispatch center may review the converted field data on a display device for coherency, procedural validity, textual quality, and/or conversion accuracy. The dispatch center may be equipped with an audio device to allow the personnel to compare the audio data to the text data. The review of the converted field data may alternatively be conducted by the field operator, by the vehicle operator, or automatically by a processor. For example, the field operator may speak an audio message, and the audio message may be converted by the communication device that displays the text data to the field operator for review and approval. In a further example, the voice-to-text conversion and review may occur within the dispatch center or the vehicle.

Once verified, the converted field data may be designated as or transformed into the vehicle data and may be communicated to the vehicle communication device. The vehicle communication device may be the same or different from the original vehicle communication device that can receive communications from the in-field computer. The vehicle data may be then stored in a local database 119. The vehicle communication device may provide the vehicle data as alphanumeric text or images for display on the vehicle display device. The vehicle data may be read by the vehicle operator. In one embodiment, the audio data and/or the audio message may be communicated to a vehicle communication device for playback on an audio device for the vehicle operator. At this stage, the audio message from the field operator may have been converted to text, verified by a personnel or operator and communicated to the vehicle operator. The voice-to-text conversion system may be employed to convert the vehicle operator's audio communications, and the dispatch center may review the communications from the vehicle operator.

A suitable vehicle operator may be a human operator of a vehicle or may be a vehicle controller or vehicle control system. The vehicle controller may be able to at least partially operate the vehicle autonomously without a human operator. In one embodiment, the vehicle operator is a person that is not aboard the vehicle but is remotely operating the vehicle. The vehicle operator may act on the vehicle data instructions and continue to receive further communications from the field operator, or likewise use a vehicle communication device to communicate back through the system. In situations where the vehicle operator is a vehicle controller, the vehicle data may include a set of operating instructions and/or a configuration file for the vehicle and may further include the boundaries of the determined zone.

Figure 2:
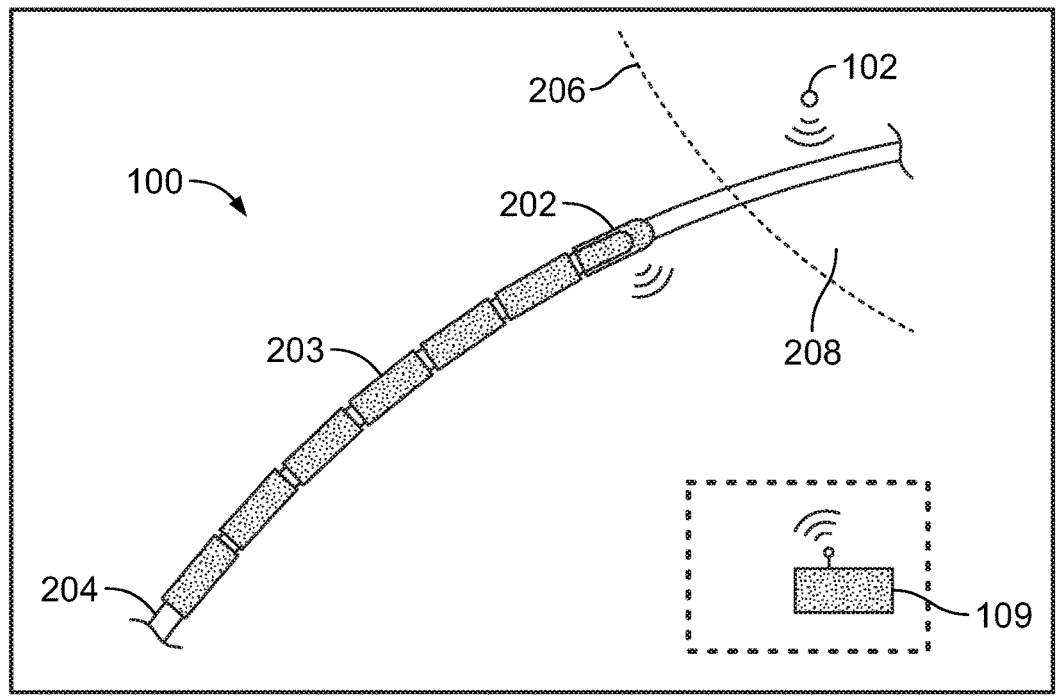
FIG. 2 is a schematic diagram of one embodiment or aspect of a system for communicating instructions to a vehicle approaching or traversing a determined zone, according to the principles of the inventive subject matter.

In reference to FIG. 2 and in one embodiment, a schematic diagram is provided of a communication network in an example interaction of a vehicle 202 that is part of a vehicle group 203 on a route 204 approaching a boundary 206 of a determined zone 208. In the example depiction, the vehicle is a locomotive that forms part of a train running over a track. The field operator may be unable to use an EIC terminal to communicate instructions to the vehicle group through the dispatch center. As the vehicle group nears the boundary of the determined zone, the field operator uses a communication device to communicate an audio message to a dispatch center. Other suitable routes may include roads, air lanes, waterways, as well as may include items of navigable and semi-navigable infrastructure such as bridges, overpasses, intersections, shoals, reefs, and the like.

The audio data of the message is converted to text data by a processor, which may be associated with the field operator, the dispatch center, the vehicle, the vehicle group, or a site independent of the preceding locations. After conversion, personnel associated with the dispatch center may review the text data to ensure that the text was properly converted. The field communication device associated with the field operator may encrypt the audio data being communicated to the dispatch center. An error code may be embedded along with a hash code. A suitable error code may be a CRC checksum. The audio data and/or the text data may be encrypted at the dispatch center. The vehicle operator or the field operator may review the converted text. This may be done either independently of or in comparison to the audio data. In response to approval by a person or an operator, the communication device associated with field operator, the dispatch center, or a remote processor may communicate the text data, alone or in combination with the audio data, to the vehicle, which may be equipped with its own communication device. The text data, the audio data, geographic data, vehicle identification data, time data, field operator data, vehicle operator data, or any combination thereof may be stored in one or more databases associated with the vehicle, the vehicle group, the dispatch center, or the field operator.

In one embodiment, the personnel or operator reviewing the text data may communicate to the dispatch center or the field operator that the message, comprising audio data and/or text data, was invalid, improper, incomplete, illegible, and/or the like, and request a new message to be sent from the field operator. Additionally, the dispatch center may monitor and record the movements and actions of the vehicle subsequent to the vehicle receiving a valid and complete message to verify that the field operator's instructions were followed. The vehicle's actions may be stored as one or more types of actionable vehicle data. Such vehicle data may include vehicle location data, vehicle speed data, vehicle direction data, responsive communication data, health status, identifiers, time/date stamps, on-board video data, engine speed, brake status, enunciation and signaling logs, or combinations thereof. The communication network may be employed for more than one field operator, vehicle, vehicle group, and/or dispatch center.

Figure 3:
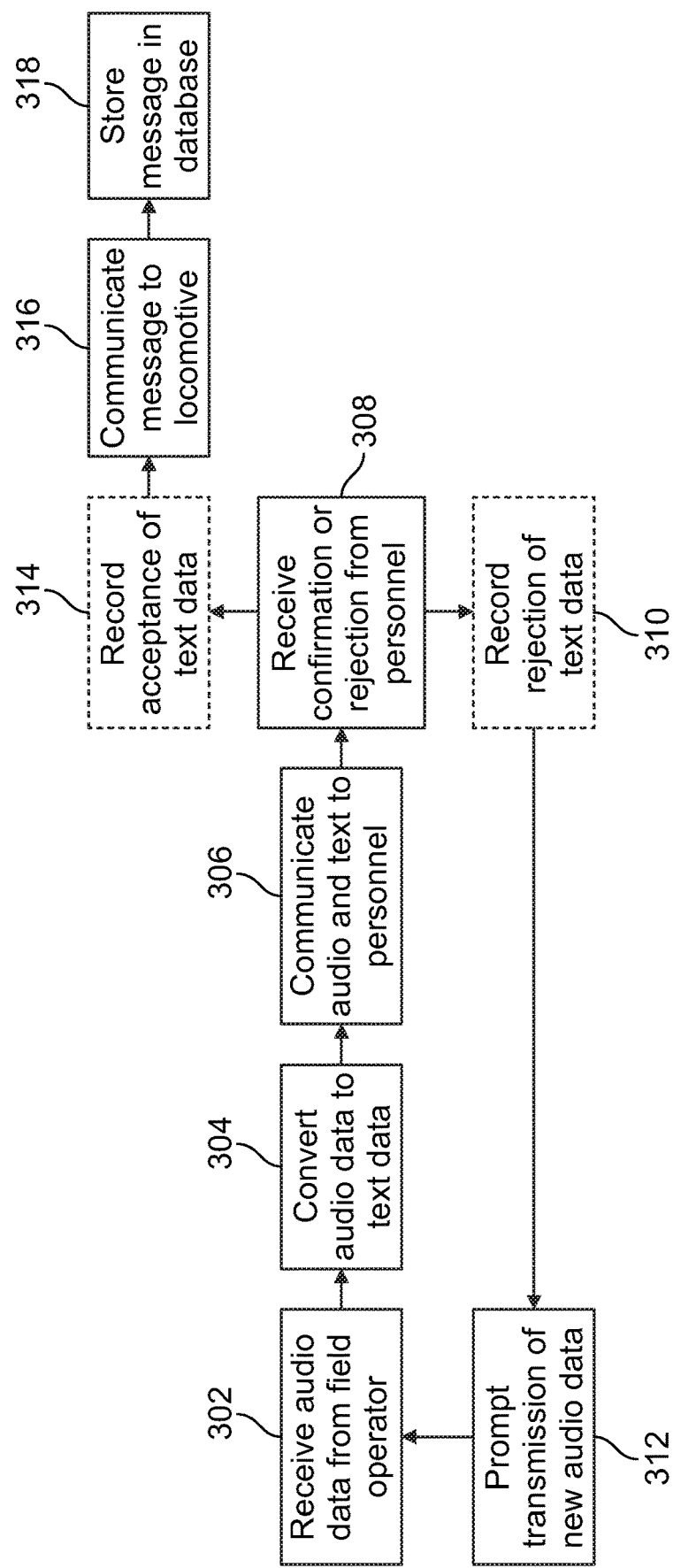
FIG. 3 is a diagram of a method for communicating instructions to a vehicle approaching or traversing a determined zone, according to the principles of the inventive subject matter.

With reference to FIG. 3, in one embodiment a step diagram of a method of communication for the above-described communication network is provided. The method depicted may be operated by a controller having at least one processor associated with or in communication with the dispatch center. At step 302, the processor receives a message from a field operator that includes, at least partially, audio data. The processor converts the audio data to text data at step 304. This step may be accomplished through a commercially available voice-to-text transcription service or a native software application operated by the processor. After the conversion of step 304, the audio data and text data may be provided to a person for review, in step 306. In step 308, personnel may review the text data to determine if the text is a valid instruction, an accurate transcription, and/or the like, and confirm or reject the text conversion, which is noted by the processor. The review of the text data may be automated in step 308. If the text data is rejected, the processor may record the rejection of the text data in a database at step 310 and prompt transmission of a new message from the field operator at step 312; thereafter, the process may be repeated from step 302. If the text is accepted, the processor may record the acceptance of the text data in a database at step 314 and communicate the text data to the target vehicle at step 316. The processor may encrypt the text data prior to communicating it to the vehicle in step 316. It may also transmit the audio data together with the text data. The text data is also stored in a database to provide a record of the message communication, at step 318. The database may be associated with or accessible to the field operator, the dispatch center, the vehicle, or an independent location.

Figure 4:
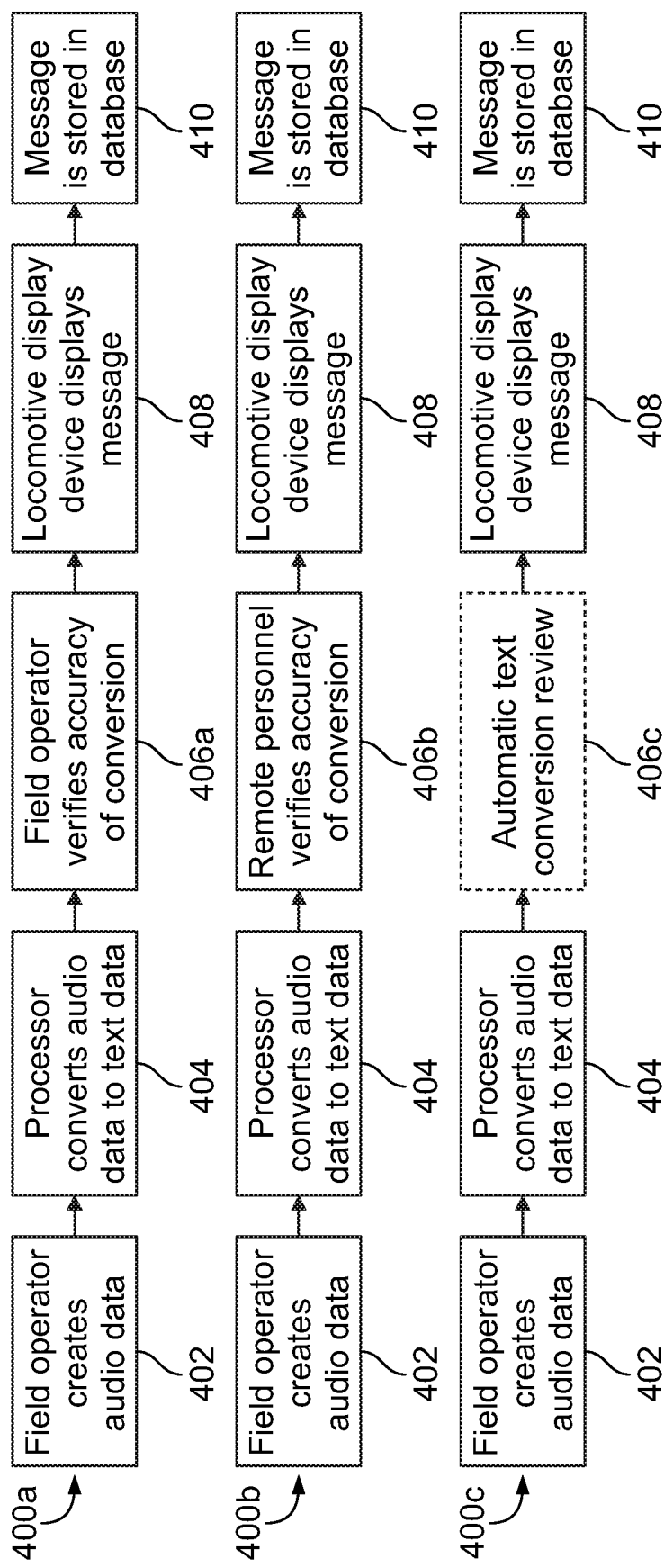
FIG. 4 is a set of diagrams of a method for communicating instructions to a vehicle approaching or traversing a determined zone, according to the principles of the inventive subject matter.

In reference to FIG. 4, in one embodiment an aspect of the inventive subject matter is shown in three step diagrams 400a, 400b, 400c depicting example audio-to-text conversion, review, display, and storage processes, carried out by the communication network. Step diagram 400a shows one example process where generation of the text data is reviewed by a field operator. According to step diagram 400a, in step 402, the field operator begins by generating a message that includes, at least partially, audio data. For example, the field operator may speak a message such as "You have clearance to proceed through the work zone at ten miles per hour." As another example, a mobile monitoring device may signal that the route is under repair and that the route will be open for travel at reduced speed in 10 minutes. The vehicle operator may chose to wait or to reroute.

This message is communicated to a processor, which converts the audio data into text data, in step 404. The processor in step 404 may be associated with the field operator's communication device, or otherwise may be separate from and communicate with the field operator's communication device. After the audio data is converted to text data in step 404, the processor communicates the text data to the field operator who verifies the accuracy of the conversion, in step 406 a. If the text data is not an accurate representation of the spoken message, the field operator may take one or more actions in response, such as cancelling the communication, requesting a new conversion, communicating a new message, or editing the text data. If the text data is an accurate representation of the spoken message, the text data is then communicated to the vehicle where the text data is displayed on a vehicle display device, in step 408. The audio data may be communicated to the vehicle so that the vehicle operator may receive the message without having to read the vehicle display device. Finally, the text data may be communicated to and stored in a database, which may be associated with the vehicle group, the field operator, or a separate location, such as a dispatch center.

In one embodiment, step diagram 400b depicts one example process where generation of the text data is reviewed by a remote personnel. According to step diagram 400b, in step 402, the field operator begins by generating a message that includes, at least partially, audio data. This message is communicated to a processor, which converts the audio data into text data, in step 404. The processor in step 404 may be associated with a dispatch center, or otherwise may be separate from and communicate with the dispatch center. After the audio data is converted to text data in step 404, the processor communicates the text data to a person associated with the dispatch center who verifies the accuracy of the conversion, in step 406 *b*. If the text data is not an accurate representation of the spoken message, the personnel may take one or more actions in response, such as cancelling the communication, requesting a new conversion, requesting a new message, or editing the text data. If the text data is an accurate representation of the spoken message, the text data is then communicated to the vehicle where the text data is displayed on a vehicle display device, in step 408. The audio data may be communicated to the vehicle so that the vehicle operator may receive the message without having to read the vehicle display device. Finally, the text data is communicated to and stored in a database, which may be associated with the vehicle group, the field operator, the dispatch center, or a separate location.

In reference to FIG. 4, in one embodiment the step diagram 400*c* depicts one example process where generation of the text data is not manually reviewed, and instead, the text may be reviewed automatically by a processor. According to step diagram 400*c*, in step 402, the field operator begins by generating a message that includes, at least partially, audio data. This message is communicated to a processor, which converts the audio data into text data, in step 404. The processor in step 404 may be associated with the field operator, a dispatch center, or a separate location. After the audio data is converted to text data in step 404, the processor or a second processor may automatically review the text for quality/accuracy of the conversion, in step 406 *c*. If the text data is not acceptable, the processor or the second processor may take one or more actions in response, such as cancelling the communication, requesting a new conversion, requesting a new message, or editing the text data. If the text data is acceptable, the text data is then communicated to the vehicle where the text data is displayed on a vehicle display device, in step 408. The audio data may also be communicated to the vehicle so that the vehicle operator may receive the message without having to read the vehicle display device. Finally, the text data is communicated to and stored in a database, which may be associated with the vehicle group, the field operator, the dispatch center, or a separate location.

As used herein, the terms "communication", "communicatively coupled" and "communicate" refer to the receipt or transfer of one or more signals, messages, commands, or other type of data. For one unit or component to be in communication with another unit or component means that the one unit or component is able to directly or indirectly receive data from and/or transmit data to the other unit or component. This can refer to a direct or indirect connection that may be wired and/or wireless in nature. Additionally, two units or components may be in communication with each other even though the data transmitted may be modified, processed, routed, and the like, between the first and second unit or component. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit.

For purposes of the description, the terms "end", "upper", "lower", "right", "left", "vertical", "horizontal", "top", "bottom", "lateral", "longitudinal", and derivatives thereof shall relate to the inventive subject matter as it is oriented in the drawing figures. However, embodiments of the inventive subject matter may assume various alternative variations and step sequences, except where expressly specified to the contrary. The specific devices and processes illustrated in the attached drawings, and described in the following specification, are exemplary embodiments or aspects of the inventive subject matter. Although the inventive subject matter has been described in detail for the purpose of illustration based on what may be practical embodiments or aspects, such detail is for that purpose and that the inventive subject matter is not limited to the disclosed embodiments or aspects. It covers modifications and equivalent arrangements that are within the scope thereof. One or more features of any embodiment or aspect can be combined with one or more features of any other embodiment or aspect.

Reference is made in detail to various embodiments of the inventive subject matter, examples of which are illustrated in the accompanying drawings. The same reference numerals used throughout the drawings may refer to the same or like parts. As disclosed below, multiple version of a same element may be disclosed. Likewise, with respect to other elements, a singular version may be is disclosed. Neither multiple versions disclosed nor a singular version disclosed shall be considered limiting. Specifically, although multiple versions are disclosed, a singular version may be utilized. Likewise, where a singular version is disclosed, multiple versions may be utilized. The description is illustrative and not restrictive. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. And, as used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle control system, comprising:
a first communication device located at or associated with a determined zone and configured to accept audio data from a field operator;
a second communication device located on or associated with at least one vehicle approaching or traversing the determined zone;
at least one processor programmed or configured to:
receive the audio data from the first communication device;
convert at least a portion of the audio data to text data; and
provide at least a portion of the text data to an operator of the vehicle for display; and
at least one database programmed or configured to receive and store at least a portion of the text data.

2. A system, comprising:
a first communication device located at or associated with a determined zone and configured to accept field data;
a second communication device located on or associated with at least one vehicle approaching or traversing the determined zone; and
at least one controller or a control system configured to:
receive the field data from the first communication device;
convert at least a portion of the field data to a message comprising vehicle data; and
provide the vehicle data to a vehicle controller or a vehicle operator, and thereby to control or operate the at least one vehicle based using the provided vehicle data.

3. The system of claim 2, further comprising at least one database that is programmed or configured to store communication data related to the field data.

4. The system of claim 2, wherein the vehicle data comprises at least one of the following: geographic data, vehicle identification data, time data, field operator data, vehicle operator data, or a combination of two or more thereof.

5. The system of claim 2, wherein the at least one controller or control system is further configured to, after transmitting the message, store, in at least one database, action data of the at least one vehicle while the at least one vehicle approaches or operates within the determined zone, the action data comprising at least one of the following: vehicle location data, vehicle speed data, vehicle direction data, responsive communication data, or any combination thereof.

6. The system of claim 2, wherein the at least one controller or control system is configured to convert the vehicle data to vehicle control commands, and thereby to control operation of the vehicle.

7. The system of claim 2, wherein the at least one controller or control system is further configured to translate a first language of words in an audio data of the field data into text, and the text is in a different second language than the first language.

8. The system of claim 2, wherein the at least one controller or control system is further configured to translate text in the field data from a first language to text in the vehicle data in a second different language.

9. The system of claim 2, wherein the at least one controller or control system is further configured to accept non-text messages and non-audio inputs and to translate and covert the non-text messages and non-audio inputs into text data.

10. The system of claim 2, wherein the at least one controller or control system is further configured to respond to dynamic zone generation, dynamic zone size by switching a mode of operation of the vehicle based at least in part on an update to a location of boundaries of the determined zone and based at least in part on the location of the vehicle relative to the boundaries.

11. The system of claim 2, wherein the at least one controller or control system is further configured to respond to moving boundaries of the determined zone by switching a mode of operation of the vehicle based at least in part on a movement of the boundaries of the determined zone and based at least in part on the location of the vehicle relative to the boundaries.

12. The system of claim 2, wherein the at least one controller or control system is further configured to generate a notification of receipt in response to successful receipt of field data or vehicle data by the first communication device, the second communication device, or both communication devices.

13. The system of claim 2, wherein the at least one controller or control system is further configured to respond to receipt of the field data with a feedback notification to the first communication device in which the notification includes one or more of the vehicle type, an estimated time of arrival for the vehicle, and other characteristics of the vehicle or a vehicle group.

14. The system of claim 2, wherein the at least one controller or control system is further configured to store input and output relating to or including the field data, the vehicle data, or both.

15. The system of claim 2, wherein the at least one controller or control system is further configured to communicate to other vehicles in a vehicle group.

16. The system of claim 2, further comprising a field display device positioned in the determined zone, the field display device programmed or configured to receive text data from the at least one controller or control system and present the text data to a field operator for review and comparison to an audio data that was communicated to the at least one controller or control system by the field operator.

17. The system of claim 2, wherein the at least one controller or control system is further programmed or configured to encrypt the message prior to transmitting the message.

18. A method comprising:
accepting field data from a first communication device that is located at or associated with a determined zone;
receiving the field data through a second communication device located on or associated with at least one vehicle approaching or traversing the determined zone;
converting at least a portion of the field data to a message comprising vehicle data;
providing the vehicle data to a vehicle controller or to a vehicle operator; and
controlling or operating the at least one vehicle based at least in part on the provided vehicle data.

19. The method of claim 18, further comprising comparing the vehicle data to the field data to determine if discrepancies exist therebetween.

20. The method of claim 18, further comprising storing in a database at least a portion of the field data or a portion of the vehicle data.

* * * * *